(12) United States Patent
Pizarro

(10) Patent No.: US 7,865,448 B2
(45) Date of Patent: Jan. 4, 2011

(54) METHODS AND SYSTEMS FOR PERFORMING CREDIT TRANSACTIONS WITH A WIRELESS DEVICE

(75) Inventor: Christian A. Pizarro, Boonsboro, MD (US)

(73) Assignee: First Data Corporation, Greenwood Village, CO (US)

( * ) Notice: Subject to any disclaimer, the term of this patent is extended or adjusted under 35 U.S.C. 154(b) by 1614 days.

(21) Appl. No.: 10/969,780

(22) Filed: Oct. 19, 2004

(65) Prior Publication Data

US 2006/0085357 A1 Apr. 20, 2006

(51) Int. Cl.
*G06Q 20/00* (2006.01)

(52) U.S. Cl. .............. 705/65; 705/39; 705/40; 705/51; 705/67; 709/229; 235/380

(58) Field of Classification Search ............ 705/64, 705/39, 40, 51, 65, 67; 707/229; 235/380
See application file for complete search history.

(56) References Cited

U.S. PATENT DOCUMENTS

| | | | |
|---|---|---|---|
| 6,859,791 B1 * | 2/2005 | Spagna et al. ............... 705/51 |
| 2004/0030659 A1 * | 2/2004 | Gueh ............................ 705/67 |
| 2006/0006226 A1 * | 1/2006 | Fitzgerald et al. .......... 235/380 |
| 2006/0016880 A1 * | 1/2006 | Singer et al. ................ 235/380 |
| 2006/0047835 A1 * | 3/2006 | Greaux ......................... 709/229 |
| 2006/0069642 A1 * | 3/2006 | Doran et al. ................. 705/39 |
| 2006/0085333 A1 * | 4/2006 | Wah et al. .................... 705/40 |
| 2006/0085357 A1 * | 4/2006 | Pizarro ........................ 705/64 |

FOREIGN PATENT DOCUMENTS

| | | |
|---|---|---|
| WO | WO 98/34203 A | 8/1998 |
| WO | WO 98/47116 A | 10/1998 |
| WO | WO 02/052879 A | 7/2002 |
| WO | WO 03/067506 A | 8/2003 |
| WO | WO 2004/049621 A | 6/2004 |

OTHER PUBLICATIONS

EP extended Search Report mailed Oct. 13, 2009; Application No. 05819662.7, 9 pages.

* cited by examiner

*Primary Examiner*—Pierre E Elisca
*Assistant Examiner*—Shahid Kamal
(74) *Attorney, Agent, or Firm*—Townsend and Townsend and Crew LLP

(57) ABSTRACT

Methods and systems are provided of initiating a wireless device for use in performing transactions. A wireless communication is received from the wireless device at a host system. The wireless communication identifies a financial account to be authorized for use in supporting transactions. A location-positioning signal is received at the host system. The location-positioning signal identifies a geographical location for the wireless device at a time when the wireless communication is received at the host system. The geographical location is determined from the location-positioning signal. An authorized address for the financial account is retrieved from a storage device in communication with the host system. It is verified that the geographical location is at a position substantially the same as the authorized address. Information defining an account transaction mechanism is transmitted wirelessly to the wireless device. The information includes an identification of the financial account.

22 Claims, 5 Drawing Sheets

METHODS AND SYSTEMS FOR PERFORMING CREDIT TRANSACTIONS WITH A WIRELESS DEVICE

BACKGROUND OF THE INVENTION

This application relates generally to use of wireless technology. More specifically, this application relates to performing transactions with a wireless device.

In recent years, there has been considerable market pressure driving the development of more versatile ways of performing transactions. This is evident in the development of transaction products that supplement traditional credit cards, such as debit cards, stored-value cards, private-label cards, loyalty-program cards, prescription cards, insurance cards, and the like. This development has been coupled with increasing pressures to address the potential for fraud, which has become of greater concern with the proliferation of new transaction products and with steadily more sophisticated techniques for committing fraud.

One example of the manner in which transactions are currently executed is illustrated with a credit-card transaction in connection with FIG. 1. A credit card may be issued to a customer by a financial institution such as a bank and typically displays a logo for an association that implements rules that govern aspects of use of the card. Account information is usually printed on the face of the card, specifying an account number and name of an authorized holder of the card; this information is also stored together with additional information on a magnetic stripe that is usually affixed to the back of the card. When the cardholder wishes to execute a transaction, such as a financial transaction for the purchase of goods and/or services, he presents the card 120 to a clerk at a merchant location, who swipes the card through a magnetic-stripe reader comprised by a point-of-sale device 108. Multiple point-of-sale devices 108 may have been provided at a variety of locations by an acquirer, who acts as an intermediary between merchants and the issuer financial institutions. As an intermediary, the acquirer coordinates transaction routing and performs a variety of backend processes.

The point-of-sale device 108 typically initiates a dialup connection to an acquirer system 112 through a network 104. A packet of information that includes information read from the magnetic stripe of the card, a merchant identifier, the date, and transaction amount are forwarded by the point-of-sale device 108 through the network 104 to the acquirer system 112. The acquirer system 112 may store some of the information and sends an authorization request to the issuing financial institution 116, which may be identified from a portion of the account number read from the magnetic stripe. The transaction is authorized or denied depending on such factors as the validity of the cardholder name, the validity of the card number, the level of available credit in comparison with the transaction amount, and the like. If authorized, an authorization code is routed back through the acquirer system 112, which captures additional information and forwards the authorization code back to the originating point-of-sale device 108 so that the transaction may be completed. Periodically, such as at the end of every day, the transactions are settled by the acquirer initiating funds transfers that fund merchant bank accounts with total transaction amounts that may have resulted from multiple transactions by multiple customers.

Other types of cards may operate with similar structures, although the details for each type of card are different. For example, use of a debit card typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. Other types of cards may use arrangements that have similar differences in their particulars.

The proliferation of various types of transaction instruments has resulted in consumers limiting their use of some instruments, in part because there is only a limited amount of space in each person's wallet or purse to carry the instruments and because of concerns that theft of the wallet or purse would result in loss of all the instruments. There is accordingly a need in the art for improved methods and systems for performing transactions.

BRIEF SUMMARY OF THE INVENTION

Embodiments of the invention thus make use of a wireless device, such as a cellular telephone, that may hold information for one or more accounts to execute transactions. The wireless device exchanges information wirelessly with a point-of-sale device in performing transactions.

Thus, in a first set of embodiments, a method is provided of initiating a wireless device for use in performing transactions. A wireless communication is received from the wireless device at a host system. The wireless communication identifies a financial account to be authorized for use in supporting transactions. A location-positioning signal is received at the host system. The location-positioning signal identifies a geographical location for the wireless device at a time when the wireless communication is received at the host system. The geographical location is determined from the location-positioning signal. An authorized address for the financial account is retrieved from a storage device in communication with the host system. It is verified that the geographical location is at a position substantially the same as the authorized address. Information defining an account transaction mechanism is transmitted wirelessly to the wireless device. The information includes an identification of the financial account.

In some such embodiments, the wireless device comprises a cellular telephone, in which case the wireless communication may comprise a cellular telephone call from the cellular telephone. In one embodiment, biometric information read from a person initiating the wireless communication is received at the host system from the wireless device and a biometric record associated with the financial account is retrieved from the storage device. The biometric information is confirmed to be consistent with the biometric record to identify the person as authorized under the financial account. In another embodiment, biometric information read from a person initiating the wireless communication is also received at the host system, and is stored on the storage device. In further embodiments, a second communication may be received from the wireless device at the host system, with the second communication including an encryption key that is stored on the wireless device. In an alternative embodiment, an electromagnetic identification code for the wireless device is received at the host system from the wireless device and stored on the storage device. The account may comprise a credit account, a debit account, or a stored-value account, among others.

In a second set of embodiments, a method is also provided of initiating a wireless device for use in performing transactions. A wireless communication is transmitted from the wireless device to a host system. The wireless communication identifies a financial account to be authorized for use in supporting transactions. A location-positioning signal is transmitted from the wireless device. Information defining an account transaction mechanism is wirelessly received at the wireless device from the host system after the host system confirms that a geographical location identified by the location-positioning signal is at a position substantially the same as an authorized address for the financial account.

In some such embodiments, the wireless device comprises a cellular telephone and the wireless communication comprises a cellular telephone call from the cellular telephone. In one embodiment, biometric information is measured with the wireless device from a person initiating the wireless communication. A biometric record is retrieved from a storage device comprised by the wireless device. The biometric information is confirmed to be consistent with the biometric record to identify the person as authorized to use the wireless device. In another embodiment, biometric information is also measured with the wireless device from a person initiating the wireless communication, and is transmitted from the wireless device to the host system. In a further embodiment, an encryption key is generated with the wireless device and transmitted to the host system. In one embodiment, an electromagnetic identification code for the wireless device is transmitted from the wireless device to the host system.

In a third set of embodiments, a method is provided of performing a transaction. A specification of terms for the transaction is received at a point-of-sale device. The terms include a transaction amount and an identification of a wireless device. At least some of the terms, including the transaction amount, are transmitted wirelessly from the point-of-sale device to the identified wireless device. Information identifying a financial account to be used in supporting the transaction is received wirelessly at the point-of-sale device from the wireless device. A request for approval of the transaction is transmitted to a financial institution. The request for approval includes an identification of the financial account and the transaction amount. An approval of the transaction is received from the financial institution.

In some of these embodiments, the financial account comprises a credit account, in which case the financial institution transfers funds to a merchant account and augments an outstanding balance of the credit account. In other of these embodiments, the financial account comprises a debit account, in which case the financial institution transfers funds to a merchant account and decrements a balance of the debit account. In still other of these embodiments, the financial account comprises a stored-value account, in which case the financial institution transfers funds to a merchant account and decrements a balance of the stored-value account. In one embodiment, the information received at the point-of-sale device from the wireless device comprises biometric information read from a person operating the wireless device. The request for approval of the transaction includes the biometric information to enable the financial institution to compare the biometric information with a stored biometric record associated with the financial account in approving the transaction. In some instances, a receipt of the transaction may be printed by the point-of-sale device.

In a fourth set of embodiments, a method is provided of performing a transaction. Terms for a transaction are received wirelessly at a wireless device from a point-of-sale device. The terms include a transaction amount. A specification is received at the wireless device of an account transaction mechanism to be used in supporting the transaction. Information related to the account transaction mechanism, including an identification of a financial account, is retrieved from a storage device comprised by the wireless device. The information is transmitted wirelessly to the point-of-sale device.

In some such embodiments, biometric information may be measured with the wireless device from a person operating the wireless device. A biometric record is retrieved from the storage device, and it is confirmed that the biometric information is consistent with the biometric record to identify the person as authorized to use the wireless device. In other such embodiments, biometric information is measured with the wireless device from a person operating the wireless device. The biometric information is transmitted from the wireless device to the point-of-sale device.

Some methods of the invention may be embodied on a wireless device comprising an antenna, a location-positioning chip, and a controller. The antenna permits wirelessly transmitting and receiving electromagnetic signals. The location-positioning chip is adapted to transmit a location-positioning signal from the wireless device. The controller is coupled with the storage device and adapted to control the antenna and location-positioning chip to initiate the wireless device for use in performing transactions as described above.

Other methods of the invention may be embodied on a wireless device comprising an antenna, an input device, and a controller. The antenna permits wirelessly transmitting and receiving electromagnetic signals. The input device is operable by a person operating the wireless device. The controller is coupled with a storage device and adapted to control the antenna and input device to perform a transaction as described above.

Still other methods of the invention may be embodied in a point-of-sale device comprising an antenna, an input device, an output device, and a controller. The antenna permits wirelessly transmitting and receiving electromagnetic signals. The controller is coupled with a storage device and is adapted to control the antenna and the input and output devices to perform a transaction as described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
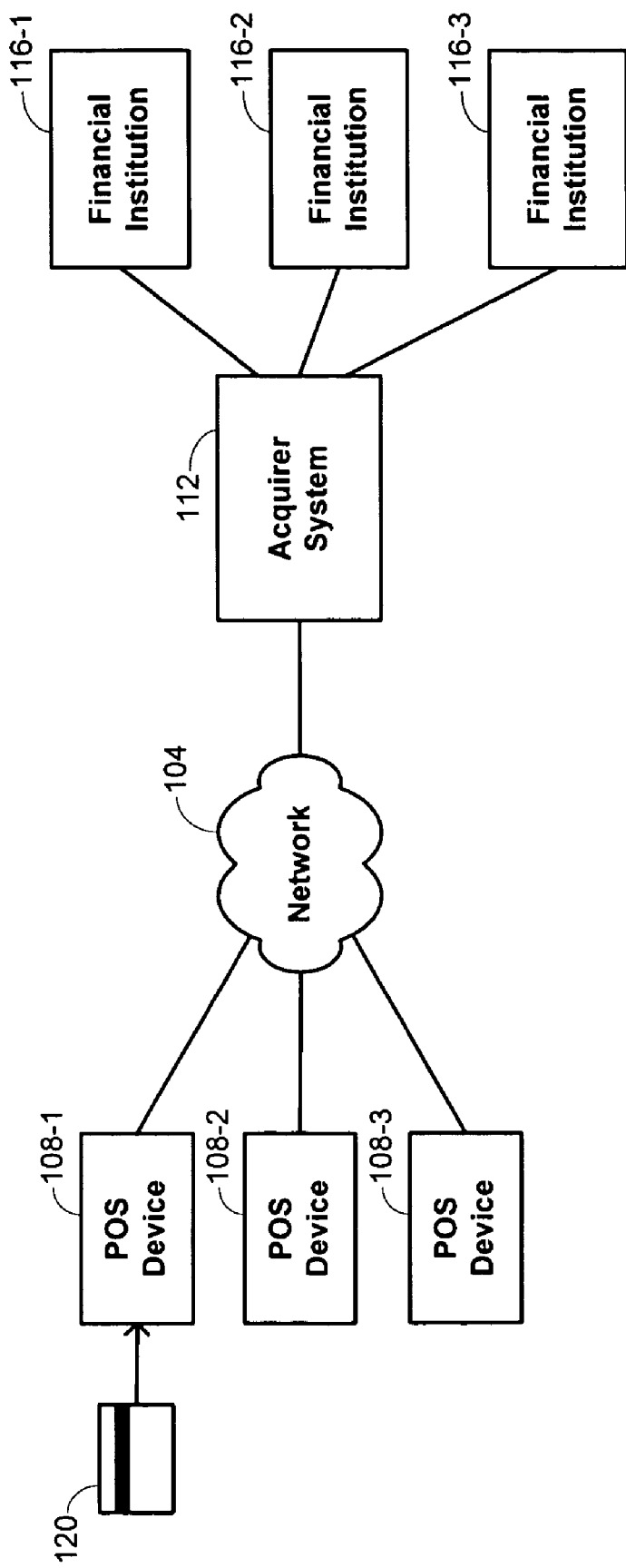
FIG. 1 provides a schematic illustration of a prior-art architecture used for processing transactions.

Embodiments of the invention make use of wireless devices to exchange information as part of systems and methods for processing transactions. As used herein, references to "wireless" exchanges of data are intended to refer to data exchanges made through the transmission of electromagnetic signals and are distinct from data exchanges that use physical connections such as copper wiring or optical fibers. A "wireless device" is a device that receives and transmits data wirelessly. In some instances, a wireless device may comprise a cellular device such as a cellular telephone or a handheld cellular email device. One example of a wireless protocol that may be used for implementing wireless transmissions is the IEEE 802.11b protocol, which is sometimes referred to in the art as implementing "Wi-Fi" transmissions.

Storage capacity on such wireless devices is used to record information regarding a number of account transaction mechanisms, each of which may have a counterpart in a traditional arrangement of transaction mechanisms embodied on individual cards. That is, one transaction mechanism may be a credit transaction mechanism in which a customer charges funds against a defined line of credit. Another transaction mechanism may be a debit transaction mechanism in which a customer decrements value in a defined account in substantially real time to support a transaction. A further transaction mechanism may be a stored-value transaction mechanism, which is similar in some respects to the debit transaction mechanism. While the account decremented as part of a debit transaction mechanism may be debited in multiple ways—such as by writing a check, by making a cash withdrawal, etc.—the account decremented as part of a stored-value transaction mechanism generally provides fewer options. In some cases, the only way to decrement such a stored-value account is with the stored-value transaction mechanism. The various transaction mechanisms may be augmented as described below to provide for loyalty programs, in which customers may accumulate points or currency that may be exchanged for bonus goods and/services in exchange for use of the transaction mechanisms.

With information regarding the account transaction mechanisms stored on the wireless device, the wireless device may be used as a surrogate for any of the cards that were previously used in executing transactions. A general overview of an architecture that may be used is provided in FIG. 2, with the wireless device 224 shown for exemplary purposes in the form of a cellular telephone. The wireless device 224 may communicate according to its normal wireless protocols with an existing network of relay stations 220. In addition, the wireless device 224 may communicate wirelessly with point-of-sale devices 204 that have been equipped for wireless communications, such as through a secure Wi-Fi connection. Communications with the financial institutions 216 that manage the accounts identified for the account transaction mechanisms may be made in a number of different ways. For example, an Internet 208 facility may be used to provide communications between the point-of-sale devices 204 and host systems 218 of the financial institutions 216 that perform the actual processing functions. Alternatively, a wireless communications system 220 may be used, permitting communications with the financial institutions to be made either from the point-of-sale devices 204 or from the wireless device 224 itself. Each host system 218 generally includes a processor, a memory device, and communications interfaces to enable the described functionality. Communications among the host systems 218 of the financial institutions 216 as may be used in effecting transfers of funds to settle transactions may be made with a separate financial network 212. Usually the financial network 212 has enhanced security and cryptographic protocols to prevent unauthorized access to the sensitive financial communications that it routes.

The information regarding the account transaction mechanisms generally identifies the account to be used in supporting transactions, including an indication of the financial institution 216 where that account is maintained. Such identifications may conveniently be made with numerical strings similar to card numbers that have portions that identify a financial institution and portions that identify specific accounts. Additional information may include ownership details of the account, current balance levels for the account, and the like. In addition, the information regarding the account may include graphical information to display a logo for the account, which may be displayed whenever information related to the account is accessed by the customer.

The wireless device may conveniently include software that allows a customer to review accounts that are identified for the account transaction mechanisms, such as in the form of an additional menu added to existing menu functionality of the wireless device 224. In some embodiments, each of the account transaction mechanisms follows a standardized format, permitting customized financial and nonfinancial applications to be provided through exchange of information between the account transaction mechanisms.

Figure 3A:
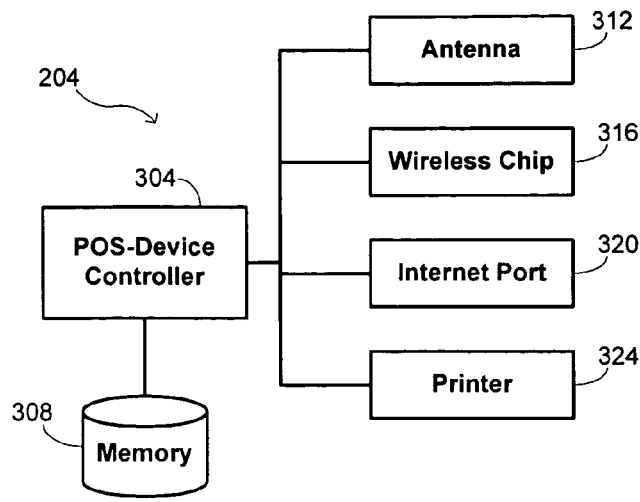
FIG. 3A provides a schematic illustration of a structure of a point-of-sale device that may be used in embodiments of the invention.
Figure 3B:
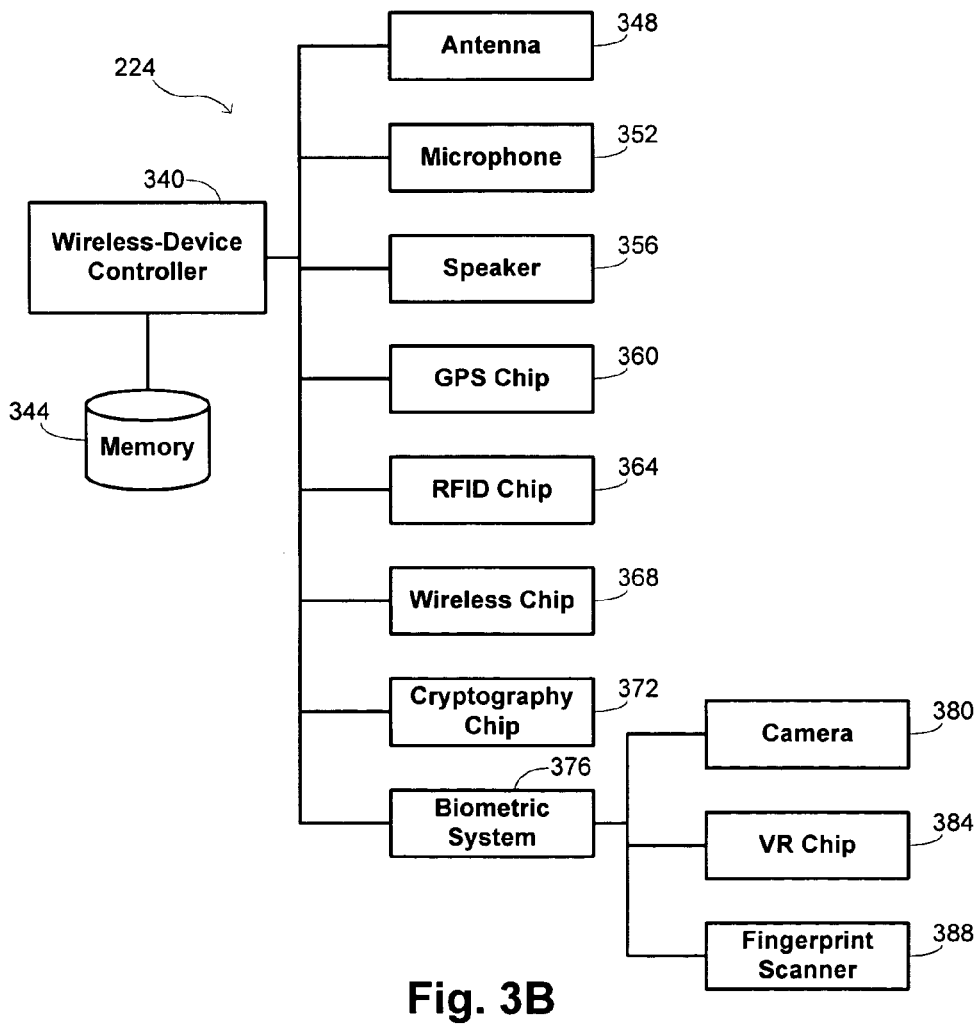
FIG. 3B provides a schematic illustration of a structure of a wireless device that may be used in embodiments of the invention.

Exemplary structures for both the point-of-sale device 204 and for the wireless device 224 are illustrated schematically in FIGS. 3A and 3B. Operations performed by the point-of-sale device are generally coordinated by a controller 304, which is provided in electrical communication with a number of components. Such components include an antenna 312 for transmitting and receiving electromagnetic signals and a wireless chip 316 that provides instructions for implementing a wireless protocol, such as a Wi-Fi protocol. The wireless chip 316 performs a more active role than the antenna 312, determining what electromagnetic signals to transmit over the antenna 312 and/or interpreting electromagnetic signals that are received by the antenna 312. A port may be provided to permit the exchange of wired communications with the point-of-sale device 204, one example of the port being a TCP/IP port that enables the point-of-sale device 204 to engage in Internet communications. A printer interfaced with the controller 304 permits receipts and other documents to be printed by the point-of-sale device 204. In addition to such components, the controller may be interfaced with a memory 308, allowing the point-of-sale device 204 to store data in implementing methods of the invention.

The wireless device 224 similarly includes a controller 340 for coordinating the functions of a variety of components and includes a memory 344 interfaced with the controller 340 for storing data. Several of the components that may be controlled by the controller 340 include components used for standard functionality of the wireless device 224. For instance, in embodiments where the wireless device 224 is a cellular telephone, the controller may be interfaced with a microphone 352, a speaker 356, and an antenna 348. The microphone 352 and speaker 356 may be used to receive and amplify voice signals that are exchanged by users of the cellular telephone. The antenna 348 may be used to transmit and receive electromagnetic signals that correspond to encoded versions of the voice signals being exchanged.

Other components may include a global positioning system 360 that may be used to locate a position of the wireless device. Such a global positioning system 360 functions by transmitting an electromagnetic signal to an orbiting satellite that identifies a relative location of the source of the signal and correlates that relative position with a geographical map of a region of the Earth. A radio-frequency identification ("RFID") chip may also be provided to transmit an electromagnetic identification signal that uniquely identifies the wireless device. While an RFID chip operates specifically at radio frequencies, the invention is not limited to operation at such frequencies and may use any electromagnetic identification signal. A wireless chip 364 similar to the wireless chip 316 provided in the point-of-sale device 204 may be provided to encode and decode transmissions sent and received electromagnetically with the antenna 348. Because transmissions involving the account transaction mechanisms include sensitive financial data such as account numbers, an cryptography chip 372 may also be provided to allow encryption of data sent by the wireless device and decryption of data received by the wireless device. Furthermore, additional security may be provided through use of a biometric system 376 that functions to use biometric data in verifying the identity of a user of the wireless device. The biometric system 376 includes an instruction module that implements an identification technique and may include a number of subcomponents that are used in collecting data to be used in performing such identifications. For example, the biometric system 376 may comprise a camera that may be used to record optical and other visible features of a user, such as a facial geometry or retinal structure that may be used in identifying the user. Alternatively or in addition, the biometric system 376 may comprise a voice-recognition chip 384 having the capability of analyzing frequency-change patterns in acoustic signals to correlate those patterns with known patterns of the individual to be identified. Similarly, the biometric system 376 may additionally or alternatively comprise a fingerprint scanner 388 that receives fingerprint patterns on a sensor provided on an exterior of the wireless device and correlates those patterns with a recorded pattern known to be associated with a particular user. As described below, in different embodiments the reference biometric patterns may be stored locally on the memory 308 so that identification is performed locally by the wireless device, or may be stored remotely so that the identification is performed remotely.

Figure 2:
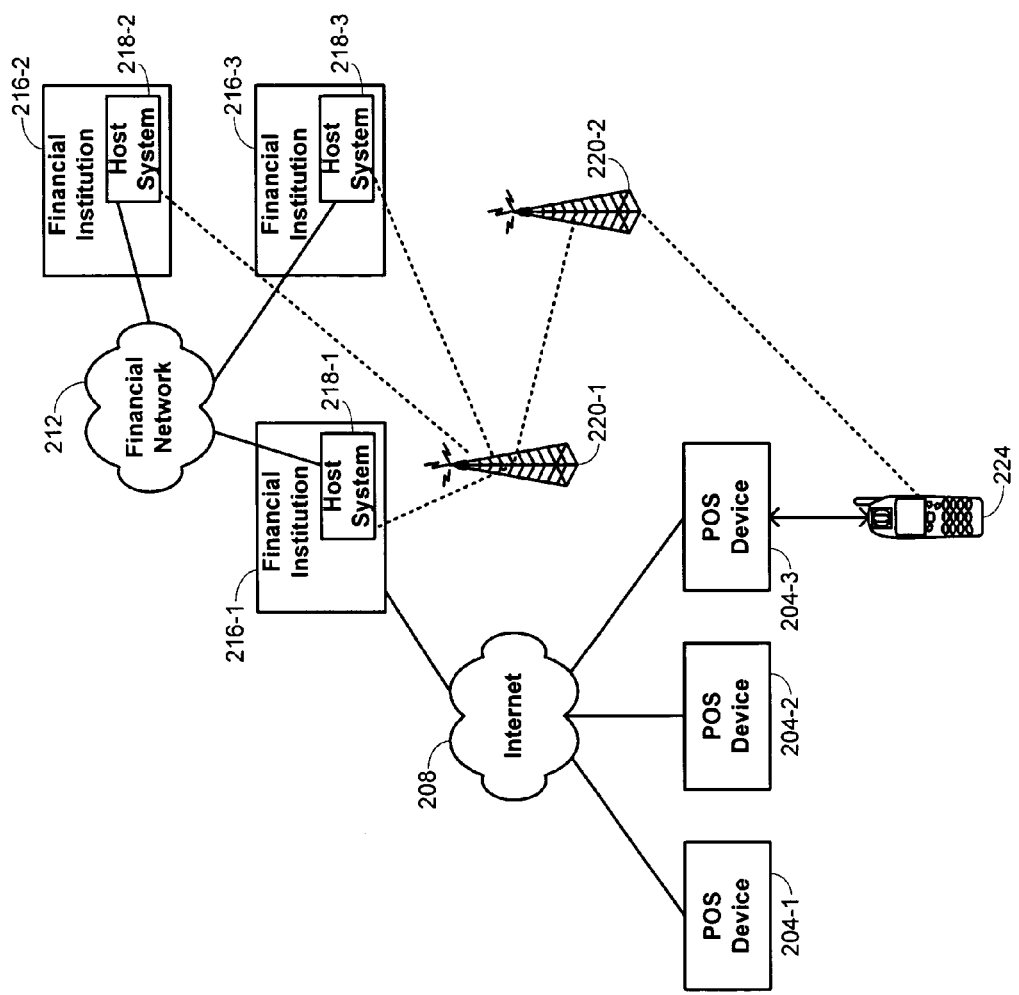
FIG. 2 provides an architecture used in one embodiment of the invention for processing transactions.

The structure described in connection with FIGS. 2-3B may thus be used in implementing methods for processing transactions. To use a particular account transaction mechanism, the wireless device may undergo an initiation phase. Such initiation is illustrated with the flow diagram of FIG. 4A. After such an initiation, the device may be used to execute transactions using the established account transaction mechanism. Such a process is illustrated with the flow diagram of FIG. 4B.

Figure 4A:
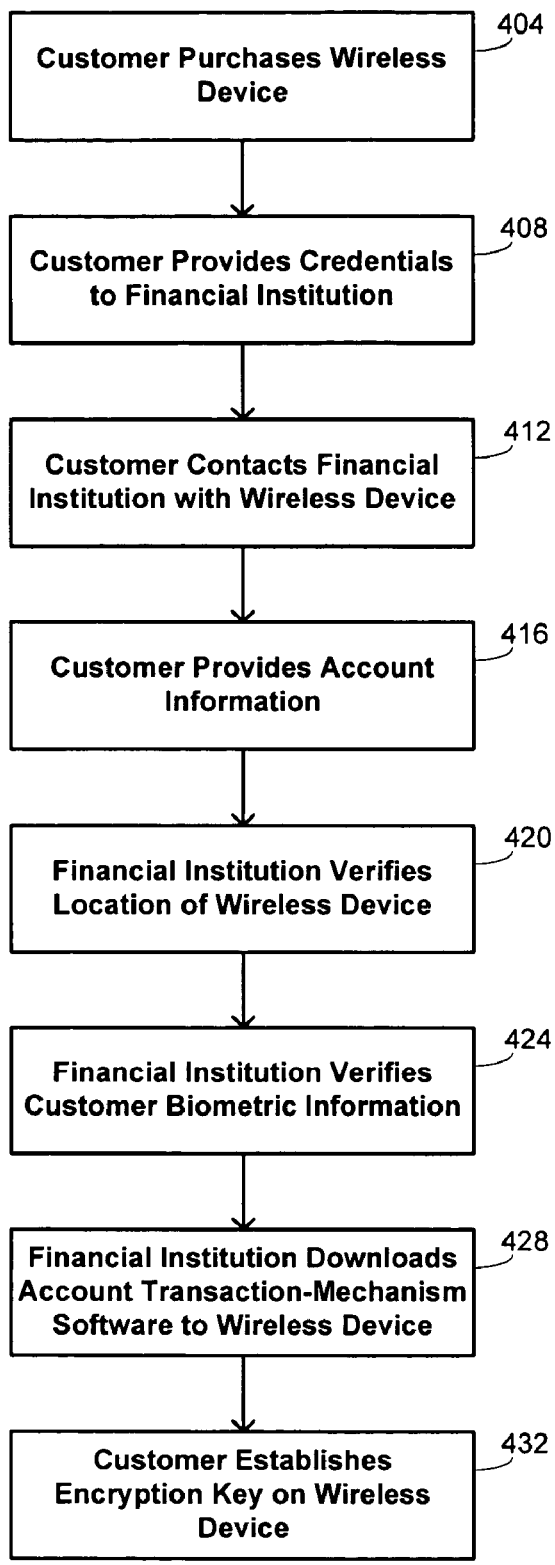
FIG. 4A provides a flow diagram illustrating a method for initiating a wireless device to be used in processing transactions in accordance with the invention.

The initiation of the device may begin at block 404 of FIG. 4A with the purchase of the wireless device by customer. Credentials are provided to the financial institution that will maintain an account for the customer at block 408. Typically such credentials comprise an identification of the wireless device, the name and address of the customer, and the like. In some cases, the credentials may include a biometric identification that is stored by the financial institution as a mechanism for future identifications of the customer. In some instances, the wireless device may be purchased directly from the financial institution or from an affiliate of the financial institution so that credential information is automatically collected at the time of purchase and not separately provided by the customer. Identification of the wireless device may be provided in the form of a code that identifies the GPS chip 360 and/or RFID chip 364, perhaps in combination with a serial number.

At block 412, the customer contacts the financial institution with the wireless device, such as by making a cellular telephone call with the wireless device in embodiments where it comprises a cellular telephone. The customer provides account information at block 416 to identify the account to be added to the wireless device. The financial institution verifies the location of the wireless device during this interaction, such as by checking the GPS signal provided by the GPS chip 360. A requirement for the initiation to be completed may be that the location of the wireless device during the call from the customer must be at the address identified in the credential information as being the address for the customer. For instance, the address may be the billing address for the customer, with the location verification being performed to ensure that the call is made from that billing address. In addition, in some embodiments the wireless device may collect biometric information from the customer with the biometric system 376 and transmit such biometric information to the financial institution during the call. This permits the financial institution to verify the customer biometric information at block 424 with biometric information on record, such as may have been supplied with the credentials. In addition, it provides a remotely stored record of the customer's biometric pattern to enable execution of remote identifications. While the location verification and biometric identification each provide assurance that the initiation is being performed by a valid customer, even greater assurance is provided in embodiments where both location verification and biometric identification are used.

Once the customer has been authenticated, the financial institution downloads software for implementing an account transaction mechanism to the wireless device at block 428. After the software has been loaded, the customer may acknowledge receipt of the software and establish a unique encryption key on the wireless device at block 432. The encryption key may subsequently be used as part of an authentication process performed when executing a transaction as described further below. In some instances, a combination of the private key established by the customer, a timestamp, and a location code derived from the GPS chip 360 may be used to create a unique one-time encryption key that minimizes the risk of possible replay attacks and is used in maintaining an accurate transaction record.

A similar initiation procedure may be used for credit, debit, prepaid, stored-value, and other types of account transaction mechanisms. In addition, any or all of the accounts may be tied to a loyalty program that permits issuers to provide loyalty rewards or to enhance existing programs by allowing the customer to customize offerings. Thus, for example, a customer may be able to select a particular account transaction mechanism to be associated with a particular loyalty program.

Figure 4B:
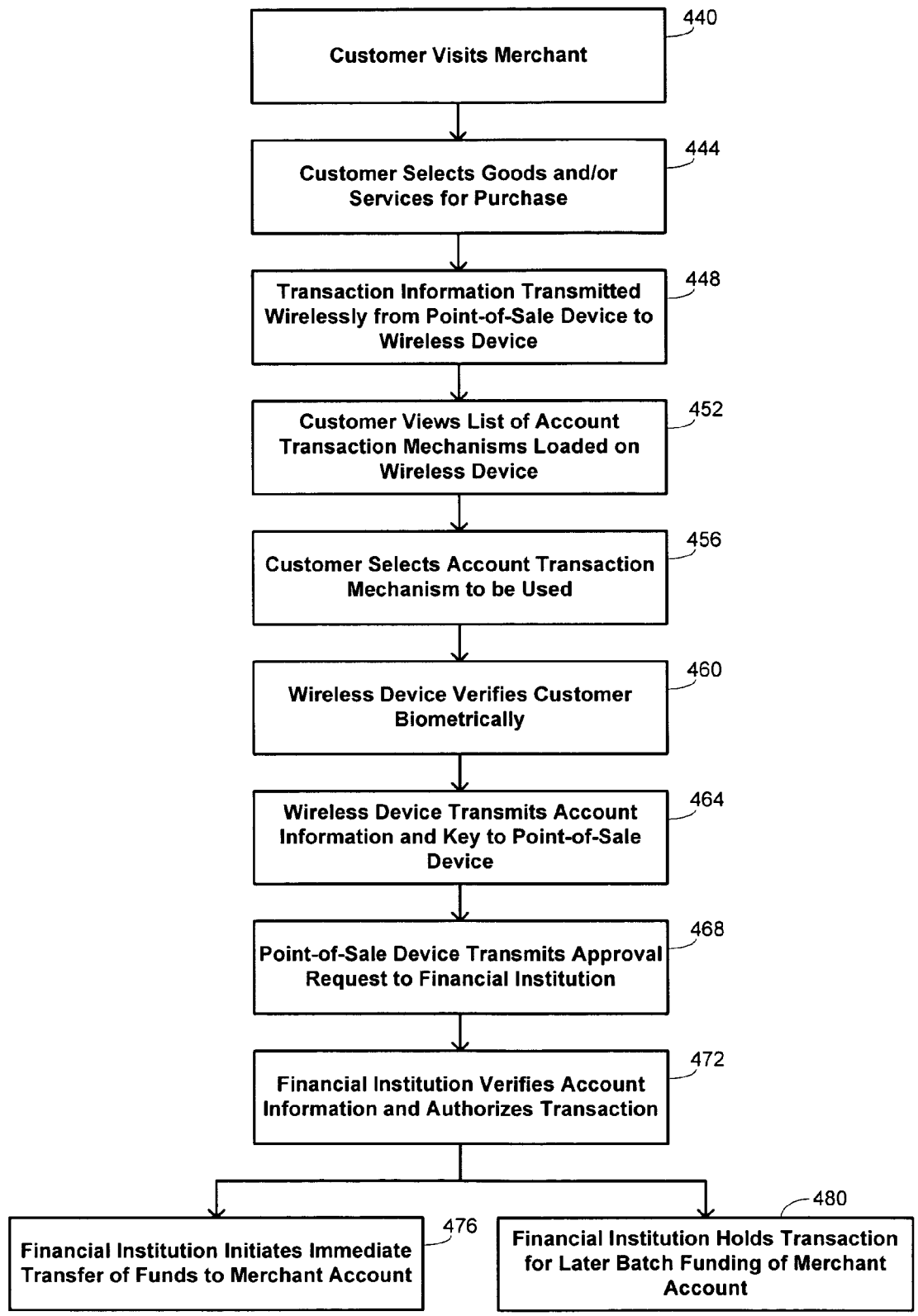
FIG. 4B provides a flow diagram illustrating a method for processing transactions in accordance with the invention.

As indicated at block 440 of FIG. 4B, execution of a transaction with an account transaction mechanism loaded on the wireless device begins with the customer visiting a merchant. The customer selects goods and/or services to be purchased at block 444 and transaction information is input into a point-of-sale device 204 having the capabilities described above. Entry of the transaction information is typically performed by a clerk, but may be performed in an automated fashion for certain merchant layouts. It should be understood that the range of devices comprised by the point-of-sale device 204 may be somewhat extended so that execution of the transaction need not require that the customer be physically at the station, although in some instances a merchant may structure its premises for security reasons to require such presence. Examples of merchants that may find it advantageous to use the extended range of the point-of-sale device include restaurants so that a customer may settle a bill without leaving the table. Furthermore, by making use of the wireless device in this way, there is a complete elimination of the risk that an employee who takes a card away from the table to execute a transaction will steal the account information or otherwise commit fraud involving the card.

For any of these configurations, the point-of-sale device transmits transaction information wirelessly to the wireless device at block 448. The wireless device that is to receive the transmission may be identified using the RFID chip 364. A display on the wireless device permits the customer to review the transaction information for correctness, ensuring that such things as the identification of the items to be purchased and their cost are correctly identified. In addition, the display permits the customer to review a list of account transaction mechanisms that have been loaded onto the wireless device. Display of logos for the various account transaction mechanisms from graphical information that has been loaded onto the wireless device may simplify the selection of the desired account transaction mechanism by the customer at block 456.

After the customer has selected the desired account transaction mechanism using functionality provided on the wireless device to make menu selections, steps may be taken to complete the transaction. In some cases, the identity of the customer may be verified prior to completing such steps, as indicated at block 460. In one embodiment, a local biometric verification is performed by using the biometric system 376 to read a biometric feature from the person using the wireless device and to compare that feature with a feature stored on the wireless device itself. In other embodiments, the biometric feature may be read using the biometric system 376 and bundled with a packet to transmit account information and the cryptographic key, as is otherwise done at block 464. In such instances, the biometric identification may be performed remotely as part of the transaction authorization.

In most instances, the account information and key are transmitted to the point-of-sale device 204, which bundles the information with a specification of the transaction parameters, including the cost for the transaction, for transmission as an approval request at block 468. An approval request transmitted from the point-of-sale device 204 may be sent wirelessly or may be sent over physical connections as described for different embodiments in connection with FIG. 2. In some alternative embodiments, the wireless device itself may bundle the transaction information with the account and cryptographic information and transmit the bundle as an approval request directly to the host system 218 of the financial institution 216. It is noted that in either instance there is no need to include an acquirer as an intermediary in coordinating transmissions, although nothing in the arrangement precludes the presence of an intermediary acquirer either.

At block 472, the financial institution 216 determines whether to authorize the transaction in accordance with its normal authorization practices and perhaps also by verifying the identity of the customer with a remote biometric comparison. If the transaction is a debit transaction, the financial institution 216 initiates an immediate transfer of funds at block 476 from the identified customer account to the merchant's account. Such a transfer of funds may involve transmission over the financial network 212 discussed in connection with FIG. 2 if the customer and merchant have accounts at different institutions. If the transaction is a credit transaction, the authorization may be generated with the transaction conveniently being held at block 480 by the financial institution 216 for batch funding with other transactions payable to the merchant account at a later time. If the transaction is authorized, the authorization is communicated back to the point-of-sale device 204. In addition to permitting the system to operate without an acquirer, this arrangement may also function without the need for individual credit companies to maintain their own networks.

In cases where the point-of-sale device 204 comprises a printer 324, the printer 324 may be used to generate a physical receipt of the transaction for the customer. In addition, the wireless device 224 may conveniently retain a copy of the transaction information and a record of which account transaction mechanism was used in executing the transaction. Systematic collection of such information provides a complete record of all transactions made by the customer with any of the account transaction mechanisms enabled on the wireless device. In some instances, the wireless-device controller 340 may further be configured to permit the data to be downloaded into a personal computer that runs commercially available personal-finance software, thereby simplify recordkeeping functions and personal financial monitoring functions by the customer.

The configurations described above conveniently enable a number of other functions. For instance, the point-of-sale device 204 may be located at a store of a chain that has stores distributed geographically, with the point-of-sale devices 204 at each of those stores provided in communication with a central processor. The central processor may retain information regarding the customer that is obtained when the first transaction is executed. Thereafter, whenever the customer enters any of the chain's stores with his wireless device, an RFID system may recognize the RFID chip 364 and generate a customized greeting for display on the wireless device, as well as customized incentives. For instance, electronic coupons may be generated that allow the customer to benefit from a reduction in price on items purchased during that visit to the store. Such customization may be expanded by offering the customer the opportunity to enroll in the chain's loyalty program so that the customized greeting may include a specification of a current status of the customer's loyalty account. In some instances, points might be added to the loyalty account simply for visiting the store.

In some instances, a customer may wish to replace his wireless device, such as for an updated model, without losing the transaction-execution functionality. The data related to the account transaction mechanisms may be considered to define an image that may be downloaded from the wireless device. Sellers of wireless devices may provide cradles that have sufficient memory to store the image for uploading into a new wireless device, or may provide communications cables to perform a direct transfer of the image to the new wireless device. In either instance, the memory in the original wireless device is thereafter erased and made unreadable. The point-of-sale devices 204 may also have their functionality kept up to date by using the wireless communications facility provided through the antenna 312 or by using the physical communications facility provided by the Internet port 320. Such communications mechanisms permit new applications to be deployed to merchants, who may be given the option to accept or reject certain aspects of updated functionality.

Having fully described several embodiments of the present invention, many other equivalents or alternative embodiments of the present invention will be apparent to those skilled in the art. For example, while the invention has been described to illustrate how transactions may be processed with a wireless device, the methods and systems of the invention may be integrated with more traditional processing systems. For instance, the point-of-sale devices may be equipped with conventional magnetic-stripe readers or smart-card readers in addition to the components described more extensively above. Such additional components permit merchants to accommodate customers who wish to use traditional card-based systems as well as customers who wish to use the wireless-based systems described. The scope of the invention should, therefore, be determined not with reference to the above description, but instead should be determined with reference to the appended claims along with their full scope of equivalents.

What is claimed is:

1. A method of initiating a cellular telephone for use in performing transactions, the method comprising:
   receiving a cellular telephone call from the cellular telephone at a host system, the cellular telephone call identifying a financial account to be authorized for use in supporting transactions;
   receiving a first location-positioning signal at the host system, the first location-positioning signal identifying a first geographical location for the cellular telephone at a time when the cellular telephone is received at the host system;
   determining the first geographical location from the first location-positioning signal;
   retrieving from a first storage device in communication with the host system an authorized physical address for the financial account;
   verifying that the first geographical location is at a position substantially the same as the authorized physical address;
   receiving at the host system from the cellular telephone, first biometric information read from a person initiating the cellular telephone call from the cellular telephone;
   retrieving a first biometric record associated with the financial account from the first storage device;
   confirming that the first biometric information is consistent with the first biometric record to identify the person as authorized under the financial account;
   receiving an encryption key from the cellular telephone at the host system;
   storing the encryption key on the first storage device;
   receiving at the host system an electromagnetic identification code from the cellular telephone;
   storing the electromagnetic identification code on the first storage device;
   wirelessly transmitting information defining an account transaction mechanism to the cellular telephone, the information including an identification of the financial account; and
   performing a transaction with the cellular telephone.

2. The method recited in claim 1 further comprising:
   receiving at the host system from the wireless device biometric information read from a person initiating the wireless communication with the wireless device; and
   storing the biometric information on the storage device.

3. The method recited in claim 1 wherein the account comprises a credit account.

4. The method recited in claim 1 wherein the account comprises debit account.

5. The method recited in claim 1 wherein the account comprises a stored-value account.

6. A method of initiating a cellular telephone for use in performing transactions, the method comprising:
   receiving a cellular telephone call from the cellular telephone at a host system, the cellular telephone call identifying a financial account to be authorized for use in supporting transactions;
   receiving a location-positioning signal at the host system, the location-positioning signal identifying a geographical location for the cellular telephone at a time when the cellular telephone call is received at the host system;
   determining the geographical location from the location-positioning signal;
   retrieving from a storage device in communication with the host system an authorized physical address for the financial account;
   verifying that the geographical location is at a position substantially the same as the authorized physical address;
   receiving at the host system from the cellular telephone biometric information read from a person initiating the cellular telephone call from the cellular telephone;
   retrieving a biometric record associated with the financial account from the storage device;
   confirming that the biometric information is consistent with the biometric record to identify the person as authorized under the financial account;
   receiving an encryption key from the cellular telephone at the host system;
   storing the encryption key on the storage device;
   receiving at the host system an electromagnetic identification code from the cellular telephone;
   storing the electromagnetic identification code on the storage device; and
   wirelessly transmitting information defining an account transaction mechanism to the cellular telephone, the information including an identification of the finalcial account.

7. The method recited in claim 1 wherein the account is associated with a loyalty program that provides loyalty rewards.

8. The method recited in claim 6 wherein the account comprises a credit account.

9. The method recited in claim 6 wherein the account comprises a debit account.

10. The method recited in claim 6 wherein the account comprises a stored-value account.

11. The method recited in claim 6 wherein the account is associated with a loyalty program that provides loyalty rewards.

12. A system for initiating a wireless device for use in performing transactions, the system comprising:
   a memory device;
   a communication interface configured to provide communication with the wireless device; and
   a processor communicatively coupled with the memory device and the communications interface, wherein the processor is configured to:
   receive, via the communication interface, a wireless communication from the wireless device, wherein the wireless communication identifies a financial account to be authorized for use in supporting transactions;
   receive, via the communication interface, a location-positioning signal, the location-positioning signal identifying a geographical location for the wireless device at a time when the wireless communication is received;
   determine the geographical location of the wireless device from the location-positioning signal;

retrieve an authorized physical address for the financial account from a storage device;

verify that the geographical location of the wireless device is at a position substantially the same as the authorized physical address;

receive, via the communication interface, from the wireless device biometric information read from a person initiating the wireless communication from the wireless device;

retrieve a biometric record associated with the financial account from the storage device;

confirm that the biometric information is consistent with the biometric record to identify the person as authorized under the financial account;

receive, via the communication interface, an encryption key from the wireless device;

store the encryption key on the storage device;

receive, via the communication device, an electromagnetic identification code from the wireless device;

store the electromagnetic identification code on the storage device; and wirelessly transmit information defining an account transaction mechanism to the wireless device, the information including an identification of the financial account.

13. The system for initiating a wireless device of claim 12 wherein the wireless device comprises a cellular telephone.

14. The system for initiating a wireless device of claim 13 wherein the wireless communication comprises a cellular telephone call from the cellular telephone.

15. The system for initiating a wireless device of claim 12 wherein the account comprises a credit account.

16. The system for initiating a wireless device of claim 12 wherein the account comprises a debit account.

17. The system for initiating a wireless device of claim 12 wherein the account comprises a stored-value account.

18. The system for initiating a wireless device of claim 12 wherein the account is associated with a loyalty program that provides loyalty rewards.

19. The method recited in claim 1 wherein performing the transaction with the cellular telephone comprises:

wirelessly receiving terms for the transaction at the cellular telephone from a point-of-sale device, the terms including a transaction amount;

receiving at the cellular telephone a specification of the account transaction mechanism to be used in supporting the transaction;

retrieving information related to the account transaction mechanism from a second storage device comprised by the cellular telephone, the information including an identification of the financial account;

determining a second geographical location of the cellular telephone from a second location-positioning signal;

retrieving from a third storage device in communication with the point-of-sale device an authorized physical address for the point-of-sale device;

verifying that the second geographical location of the cellular telephone is at a position substantially the same as the authorized physical address; and wirelessly transmitting the information to the point-of-sale device.

20. The method recited in claim 19 further comprising:

measuring second biometric information with the cellular telephone from the person operating the cellular telephone;

retrieving a second biometric record from the second storage device; and confirming that the second biometric information is consistent with the second biometric record to identify the person as authorized to use the cellular telephone.

21. The method recited in claim 20 further comprising transmitting the second biometric information from the cellular telephone to the point-of-sale device.

22. A cellular telephone that is initiated for use in performing Transactions comprising:

an antenna for wirelessly transmitting and receiving electromagnetic signals;

an input device operable by a person operating the cellular telephone; and a controller coupled with a storage device and adapted to control the antenna and input device to initiate the cellular telephone in accordance with the following:

providing a cellular telephone call to a host system with the cellular telephone, wherein the cellular telephone call identifies a financial account to be authorized for use in supporting transactions;

providing a location-positioning signal to the host system, the location-positioning signal identifying a geographical location of the cellular telephone at a time when the cellular telephone call is provided to the host system, wherein the host system:

determines the geographical location of the cellular telephone from the location-positioning signal;

retrieves an authorized physical address for the financial account from a storage device in communication with the host system; and verifies that the geographical location of the cellular telephone is at a position substantially the same as the authorized physical address;

providing to the host system from the cellular telephone, biometric information read from the person operating the cellular telephone, wherein the host system:

retrieves a biometric record associated with the financial account from the storage device; and confirms that the biometric information is consistent with the biometric record to identify the person as authorized under the financial account;

providing to the host system, an encryption key from the cellular telephone, wherein the host system stores the encryption key on the storage device;

providing to the host system, an electromagnetic identification code from the cellular telephone, wherein the host system stores the electromagnetic identification code on the storage device; and receiving at the cellular telephone from the host system, information defining an account transaction mechanism, the information including an identification of the financial account.

* * * * *